United States Patent Office 3,290,935
Patented Dec. 13, 1966

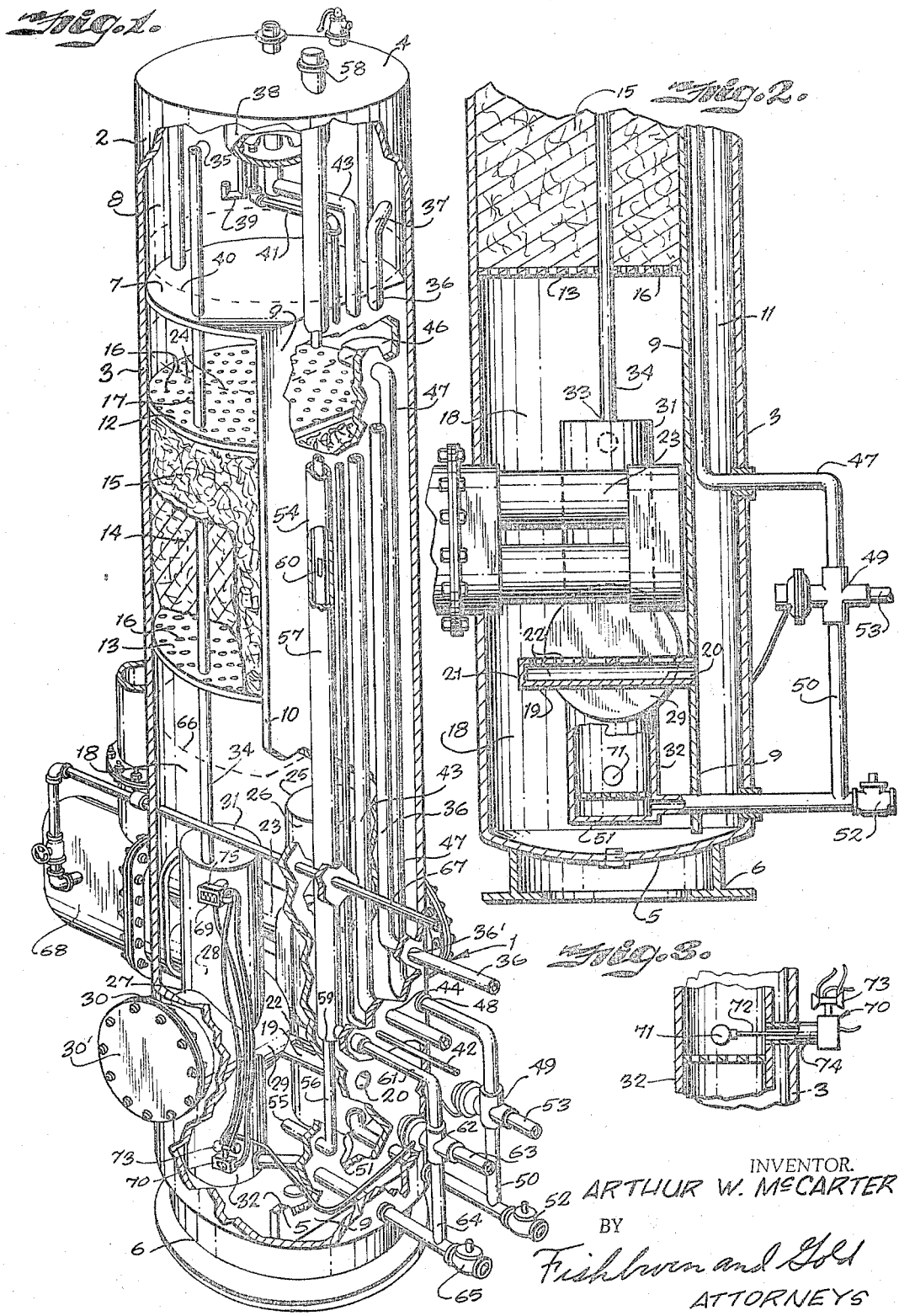

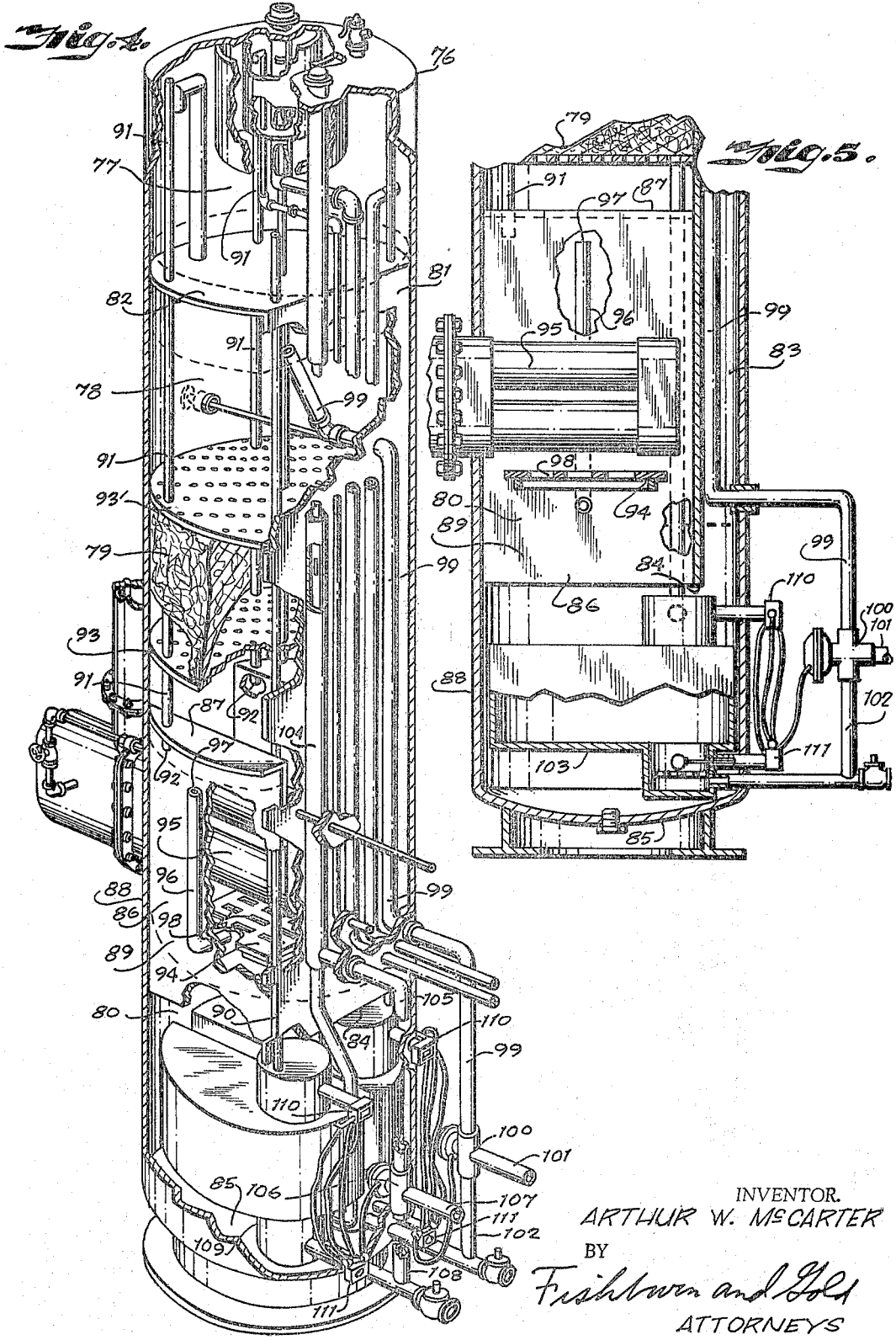

3,290,935
TREATER SEPARATOR METER ASSEMBLY
Arthur W. McCarter, Great Bend, Kans., assignor to O'Neill Tank Company, Inc., Great Bend, Kans., a corporation of Kansas
Filed Jan. 7, 1964, Ser. No. 336,305
3 Claims. (Cl. 73—200)

This invention relates to treater separator structures for separating liquids and gas as from petroleum well streams and metering the liquids produced, and more particularly to such an assembly for use in separating and metering therefrom two liquids of different densities and maintaining similar temperatures thereof.

Petroleum wells normally produce a mixture of water, liquid hydrocarbons and gas and it is common for the mixture to include an emulsion. The well streams may be variously treated to effect separation of the gas and liquids and also to break the emulsions whereby the water and liquid hydrocarbon or oil may be separated. Heretofore, such petroleum well streams have been introduced into heater treater structures wherein the emulsion is heated with the water settling out and oil collecting thereabove, and then the oil and water has been removed from the treater and thereafter metered if desired. In such operations, particularly in cold weather, paraffin and other deposits occur on the walls of the oil metering chamber and the water may freeze and interrupt the operation. Also, separate metering vessels require installation time and fittings, as well as greater foundation or platform space then is required for the treater.

The principal objects of the present invention are to provide a treater separator meter assembly for separating and metering two liquids of different densities with metering vessels surrounded by one of the separated liquids in the assembly to maintain similar temperatures therein; to provide a treater separator meter assembly including a vessel adapted to contain under pressure a layer of light liquid with a heavier liquid thereunder forming a liquid-liquid interface with heating means in the vessel below said interface and metering apparatus for the two liquids including metering vessels located in said treater vessel and surrounded by said heated heavier liquid; to provide such a structure wherein removal of the heavier liquid from the treating vessel effects circulation therein and heat applied to the metering vessels to maintain a substantially uniform temperature of the metered liquids; to provide such a structure wherein the separated liquids are metered in a manner as to not be directly subject to outside temperatures; to provide such a structure wherein the heat applied to the metering vessels lessens deposits on the walls of the metering chambers; to provide such a structure wherein the metering vessels have central portion of substantial volume with upper and lower reduced volume ections for increased level change per unit of volume and greater accuracy of metering control; to provide a treater separator meter assembly with separate metering vessels for two separated liquids with liquid level responsive means in the upper and lower portions of the metering vessels to alternately introduce respective liquids and withdraw same from the respective metering vessels; and to provide a treater separator meter assembly that is efficient in operation, economical to maintain and dependable in use.

Other objects and advantages of this invention will become apparent from the following description taken in connection with the accompanying drawings wherein are set forth by way of illustration and example certain embodiments of this invention.

FIG. 1 is a perspective view of treater separator meter assembly embodying the present invention with portions broken away to show the structure thereof.

FIG. 2 is a vertical sectional view through the lower portion of the treater separator meter assembly generally taken on the line 2—2, FIG. 1.

FIG. 3 is a detail sectional view through a float mechanism of a meter apparatus.

FIG. 4 is a perspective view of a modified form of treater separator meter assembly with portions broken away to illustrate the structure thereof.

FIG. 5 is a vertical sectional view through the assembly substantially taken on the line 5—5, FIG. 4.

Referring more in detail to the drawings:

The reference numeral 1 generally designates a treater separator meter assemby which includes an upright cylindrical vessel 2 having a side wall 3 and top and bottom walls or heads 4 and 5 which are preferably domed or dished. The vessel 2 is carried upon a cylindrical support or base member 6 suitably secured to the bottom wall 5 for resting on a foundation or platform as in conventional practice. In the upper portion of the vessel 2, there is a transverse partition 7 forming in the upper portion of the vessel a gas separation chamber 8. At one side, the partition 7 terminates in a connection with a downcomer or vertical wall 9 which, in the illustrated structure, extends near the bottom wall 5 and side edges 10 are secured as by welding to the side wall 3 whereby the wall 9 cooperates with a minor portion of the side wall 3 to form a flow space 11 for downflow of liquid from the gas separation chamber 8, as later described.

The vessel 2 has vertically spaced plates 12 and 13 below the partition 7 with peripheral edges of the plates secured to the side wall 3 and the wall 9 to cooperate therewith to define a filter zone 14 therebetween. A fibrous filter media 15 such as hay, excelsior or the like fills said filter zone. The plates 12 and 13 each have a plurality of apertures 16 for flow of liquid therethrough but a size whereby the fibrous filter media is retained therebetween. The plate 12 is spaced below the partition 7 to define a lighter liquid or oil outlet zone 17 therebetween. The plate 13 has substantial spacing from the bottom wall 5 to define therebetween a vertically disposed heating zone or space 18 of considerable height.

An emulsion or liquid stream distributor 19 communicates with the flow space 11 and extends transversely in the heating zone 18 and in the illustrated structure the distributor is in the form of a pipe having one end 20 opening into the flow space 11 and the other end closed as at 21. A plurality of slots or openings 22 are arranged in the upper portion of the distributor pipe whereby emulsion or liquid can flow from the flow space 11 into the distributor and then out into the heating zone 18 for upward flow therein. A return bend fire-tube 23 or any other suitable or desirable type of heating unit is positioned between the plate 13 and the distributor 19 so that as the emulsion stream or liquid flows upwardly thereover it will be heated to the proper temperature for breaking and resolving the emulsion components of the well stream into their water and clean oil components. The entire treating structure is normally filled with heated liquids to a lighter liquid or oil overflow level indicated by the broken line 24 in the outlet zone 17 so that the entire heating zone and heating unit will be immersed in liquids heated to a greater or lesser degree.

The distributor 19 and the heater 23 are preferably arranged whereby they extend substantially diametrically of the vessel to provide space on both sides thereof. The assembly is provided with metering apparatus for metering two liquids of different densities, as for example oil and water, with the apparatus 25 for metering the lighter liquid or oil including a metering vessel 26 and the metering apparatus 27 for metering the heavier liquid or water including a metering vessel 28. The metering vessels 26 and 28 are disposed in the lower portion of the heating zone 18 on opposite sides of the distributor 19. In the structure illustrated, each of the metering vessels 26 and 28 have central portions 29 that are substantially cylindrical and horizontally arranged with an open end 30 extending through the side wall 3 and closed with a manhole cover 30' which permits ease of access and cleaning. Each of the metering vessels include upper and lower portions 31 and 32 respectively that are of reduced volume sections; in other words, they are smaller in horizontal cross-sectional area to provide a more rapid change of level of liquid therein per unit volume, the metering vessels each having level-responsive members communicating with the upper and lower portions for controlling filling and emptying as later described. Each of the metering vessels have their upper portions or ends 33 connected by ducts 34 that extend upwardly through the treating vessel and terminate in open ends 35 in the gas separation chamber 8 adjacent the top wall 4 for equalization of pressure.

A stream to be treated, as for example a petroleum well stream, is connected to a well stream inlet conductor 36 that extends into the vessel 2 near the lower portion thereof as at 36' and then upwardly through the flow space 11 to the separation chamber 8 where the well stream is directed through a diverter 37 providing the stream with a swirling action, allowing most of the gas to break out and flow through a mist extractor 38 located in the upper portion of the gas separation chamber 8. The mist extracted in the mist extractor 38 flows down through a drain 39 into liquid that accumulates on the partition 7 as to a level shown by the broken line 40 providing a head for the liquid flowing down the flow space 11 to the distributor 19. Some of the gas from the mist extractor is bled off through a line 41 that extends down the flow space 11 and out of the vessel 2 as at 42 to provide a gas supply for controls and the like. The remainder of the gas flows through a conduit 43 that extends down the flow space 11 and out of the vessel 2 as at 44 to provide a gas outlet for use of the gas as desired.

The accumulated liquids and emulsions flow down the flow space 11 into the distributor 19 through the apertures or slots 22 and then upwardly around the heater 23. The heating reduces the viscosity of the liquids of which the emulsion stream is composed and especially the petroleum portions thereof whereby the breaking of the emulsions is facilitated and the emulsion components of the well stream are resolved into their water and clean oil components, with the lighter liquid such as the oil moving upwardly and the water tending to settle to the bottom. This movement, together with the withdrawal of the liquids, as later described, provides a continuous movement or circulation of the liquid and more effective heating of all of the liquid in the heating zone. The water and oil components separating and stratifying by gravity, results in the oil rising into the uppermost portion of the heating zone 18 under the plate 13. The oil rises through the perforated plate 13 into the filter zone 14 wherein the fibrous material such as excelsior or the like forms a coalescing bed that is effective in agglomerating separated oil particles. The collected oil rises to the level 24 and overflows into an open end 46 of an oil conduit 47 that extends through the wall 9 and downwardly in the flow space 11 and, in the illustrated structure, outwardly of the vessel 2 as at 48 where it is connected to a valve 49, said valve having one branch connected by a line 50 that extends into the vessel and communicates with the metering vessel 26 adjacent the bottom 51 thereof. The line 50 has a branch with a valve 52 for draining the metering vessel 26 when desired. The valve 49 also has another branch connected to an oil outlet or discharge line 53.

Water is removed from the lower portion of the treating vessel 2 by means of a suitable flow line which, in the illustrated structure, is in the form of a siphon or water leg 54. The inlet to the siphon is preferably near the lower portion of the heating zone 18 as through an open end 55 of a pipe 56 which extends through the wall 9 and upwardly in the flow space 11. The upright portion of the pipe 56 is surrounded by a larger pipe 57 which, in the illustrated structure, has an upper closed end extending through the head 4 as at 58 and a lower closed end 59. The pipe 56 has openings 60 located therein whereby the combined head of oil and water in the vessel 2 from the oil level 24 downwardly equals the head of water in the siphon at the opening 60 whereby water will flow through the pipe 56 and out through the opening 60 downwardly in the pipe 57 and then through a pipe 61 connected to the lower end of said pipe 57. The pipe 61 extends outwardly of the vessel 2 and is connected to a valve 62 which also has a branch connected to a water outlet or discharge pipe 63 and another branch connected by a pipe 64 to the lower end adjacent the bottom of the metering vessel 28, the pipe 64 also having a drain valve connection 65. The opening 60 in the water siphon is preferably arranged whereby there is a liquid-liquid interface in the upper portion of the heating zone as illustrated by the broken line 66. A fuel line 67 extends through the treating vessel in the heating zone 18 and then outwardly to the burner end 68 of the heater to supply fuel thereto.

Each of the metering vessels has an upper level-responsive member 69 and a lower level-responsive member 70 which include floats 71 on rods 72 that are mounted to actuate pilot members 73 on outer ends of tubular members 74 that extend through the wall 3 of the vessel. The valves 49 and 62 may be electric or pneumatic operated and the pilot members 73 are such that the valves 49 and 62 are actuated for alternately filling and emptying the respective metering chambers. The pilot members 73 are conventional float-actuated devices to apply operating media to the conventional valves 49 and 62. When the level of liquid in the metering chamber is at the lower portion so that the float 71 on the lower responsive means 70 moves down the pilot member 73 thereof, the actuating medium is transmitted to the respective valve, as for example the valve 49 of the oil metering apparatus, to move same to a position where communication to the line 53 is closed, and there is communication from the flow line 47 to the line 50 whereby the oil from the oil outlet chamber or zone 17 flows downwardly into the oil metering vessel 26. The level rises, and even though the float 71 will rise to the limit of its position, the valve 49 retains its position until the level in the vessel 26 reaches the float on the upper level-responsive member 69 and raises the float thereof to trip the respective pilot member 73 which actuates the valve 49 to close the communication from the line 47 and opening the flow from the line 50 to the outlet 53 whereby the oil in the metering vessel 26 flows through the oil outlet line 53 until the level reaches the lower point to actuate the lower level-responsive member 70 to repeat the cycle. The same action is provided in the water or heavier liquid metering vessel 28 and the level-responsive means thereof to actuate the valve 62 for flow of water from the lower part of the heating zone in the treating vessel 2 through the water siphon and pipe 61 to the metering vessel 28 to fill same and, when filled, the respective upper level-responsive member 69 will actuate the valve 62 to close the line 61 and open the flow from the line 64 through the water outlet line 63 so that the water in the water metering vessel 28 flows therefrom, the water metering vessel 28 being alternately filled and emptied. Suitable counters for each metering vessel as at 75 are actuated by the respective upper level-responsive member 69 to indicate the cycle of the filling and emptying of the particular metering vessel.

The arrangement of the metering vessels in the heating zone 18 provides substantially uniform temperature of the metered liquid as said liquids are not directly subject to outside temperatures. The heated liquid or water in the heating zone 18 is such that it helps to break emulsions and thereby subjects the walls of the metering vessels to such a temperature as to substantially eliminate deposits of paraffin and the like on said walls.

In the form of the invention illustrated in FIGS. 4 and 5, the treater vessel 76 is similar to the vessel 2 and has partitions and plates arranged therein to form a gas separation chamber 77, an oil outlet zone 78, a filter zone 79 and a heating zone 80. It also has a vertical wall or downcomer 81 extending from a partition 82 defining the bottom of the gas separation chamber 77 to form a flow space 83 for flow of liquid downwardly to the heating zone or chamber 80. However, the wall 81 terminates in a lower end 84 spaced from the bottom wall 85 of the vessel and laterally spaced vertical walls 86 extend from the wall 81 toward the opposite side of the vessel and the upper ends of the walls 86 are connected by top walls 87 to cooperate with the side walls 88 of the vessel 76 to form preheat sections 89. The vertical wall 81 has openings 90 near but spaced above the lower end 84 to provide flow communication from the flow space 83 to the preheat sections 89. Pipes 91 have open lower ends 92 spaced below the preheat section top walls 87 and extend upwardly therethrough and through the perforated plates 93 and 93' and the partition 82 to the upper portion of the gas separation chamber to provide pressure equalization.

A spreader plate 94 is mounted in the heating zone 80 between the walls 86 and a suitable return bend firetube 95 or other suitable heater is arranged in the heating zone above the spreader plate 94, as illustrated in FIG. 5. Each of the preheat sections have pipes 96 with inlet openings 97 in the upper portion of the preheat sections, said pipes extending downwardly and through the walls 86 terminating under the spreader plate 94 whereby the emulsion passing through the openings 90 into the preheat sections is forced up in the preheat sections and is heated with any gas breaking out rising to the top and passing through the pipes 91 to the gas separation chamber. Water settles to the bottom and oil will flow through the preheat oil pipes 96, under the spreader 94 and upwardly through the apertures 98 therein and around the heater 95, heating the emulsion, causing the resolving thereof into the components of water and oil, the water settling to the bottom and the oil rising, passing up through the filter zone into the oil outlet zone.

The oil from the oil outlet zone 78 flows through an oil flow pipe 99 that is connected to a valve 100 which valve is also connected to an oil outlet or discharge line 101 and another branch of the valve is connected by a line 102 to the lower end portion of an oil meter vessel 103. Water flows through a water siphon or water leg 104 and then through a pipe 105 connected to a valve 106 which is also connected to a water outlet or discharge pipe 107 and is connected through a pipe 108 to the lower portion or bottom of a water metering vessel 109. The water inlet to the siphon is adjacent the bottom of the treater vessel or heating zone 80 thereof so that the heated water is drawn downwardly providing a circulation that heats the area in which the metering vessels are located. Due to the preheat sections, the metering vessels are of lesser height than those shown in FIGS. 1 and 2 and are shaped to have a large volume in the central area and be positioned in the heating zone with the heated liquid surrounding same so that the metering liquid is not subject directly to the outside temperatures. The metering vessels each have upper and lower level-responsive members 110 and 111 to control the valves 100 and 106 so that the operation of the structure shown in FIGS. 4 and 5 is substantially the same as that described relative to the structure shown in FIGS. 1 and 2 as far as metering the separated lighter and heavier liquids, the metering vessels being surrounded with heated liquid and protected from freezing or coating of walls with deposits which might otherwise occur in cold weather.

While I have described certain forms of my invention, it is not to be limited to the specific forms or arrangements of parts herein described and shown except insofar as such limitations are included in the claims.

What I claim and desire to secure by Letters Patent is:

1. A treater separator meter assembly for treating petroleum well streams separating gas, water and oil and metering the water and oil production comprising, a well stream treating vessel having side, top and bottom walls, a horizontal partition in the upper portion of the vessel spaced from the top wall and defining a gas separation chamber, a vertical wall extending downwardly from said partition and defining with a minor portion of the vessel side wall a flow space extending from said gas separating chamber to adjacent the bottom wall of said vessel, a partition in the treating vessel below said first-named partition and defining with the vertical wall and the major portion of the vessel side wall a heating zone, and an oil outlet zone, said oil outlet zone being adjacent to and below the gas separation chamber, conductor means conducting the well stream to the gas separation chamber with liquid thereof collecting on said first-named partition and flowing downwardly in the flow space, heating means in the heating zone, means including a distributor communicating the flow space with the heating zone below the heating means for flow of said well stream liquid to the heating zone and distribution therein to be heated therein with free water collecting in the lower portion of the treating vessel and oil rising upwardly in the heating zone toward the oil outlet zone, an oil metering apparatus and a water metering apparatus each having a metering vessel in said treating vessel in the lower portion thereof, said metering vessels being spaced apart with each having a central portion with reduced volume sections forming upper and lower portions, said metering vessels being defined by outer walls spaced inwardly from all walls of the treating vessel whereby said metering vessels are substantially surrounded by liquids in said treating vessel, a duct for each of said metering vessels communicating the top portions thereof with the upper portion of the treating vessel for pressure equalization, an oil overflow line communicating with the oil outlet zone to maintain an oil level therein, said oil overflow line extending downwardly and communicating with the lower portion of the oil meter vessel, a water siphon assembly having an inlet in the lower portion of the treating vessel and an outlet disposed to maintain an oil-water interface in the upper portion of the heating zone, the water siphon outlet duct communicating with the lower portion of the water meter vessel for flow of water thereto from said water siphon, an oil discharge line, a water discharge line, a three-way valve in the oil metering vessel inlet line connected with the oil discharge line, a three-way valve in the water metering vessel inlet line and having connection with the water discharge line, means responsive to the rise of liquid level in the upper portion of the oil metering vessel and operatively connected with the three-way valve in the oil line to close the flow from the oil outlet zone and effect communication from the metering vessel to the oil discharge line for discharge of oil from said oil metering vessel, means responsive to lowering of the liquid level in the oil metering vessel and operatively connected with the respective three-way valve to actuate same to close the oil discharge line and effect communication from the oil outlet zone to the oil metering vessel for filling of said oil metering vessel and corresponding means responsive to rise of level in the upper portion of the water metering vessel and the lowering of level in the lower portion of said water metering vessel and operatively connected to the respective three-way valve in the water line for permitting filling of said water metering vessel and the discharge of the water therefrom through the water discharge line.

2. A treater separator meter assembly for treating petroleum well streams separating gas, water and oil and metering the water and oil production comprising, a well stream treating vessel having side, top and bottom walls, a horizontal partition in the upper portion of the vessel spaced from the top wall and defining a gas separation chamber, a vertical wall extending downwardly from said partition and defining with a minor portion of the vessel side wall a flow space extending from said gas separating chamber to adjacent the bottom wall of said vessel, vertically spaced partitions in the treating vessel below said first-named partition and defining with the vertical wall and the major portion of the vessel side wall a heating zone, a filter zone and an oil outlet zone, the filter zone being between the heating zone and the oil outlet zone with said oil outlet zone adjacent to and below the gas separation chamber, fibrous filter media in the filter zone between said spaced partitions with said spaced partitions having a plurality of perforations therein for flow of oil therethrough, conductor means conducting the well stream to the gas separation chamber with liquid thereof collecting on said first-named partition and flowing downwardly in the flow space, heating means in the heating zone, means communicating the flow space with the heating zone below the heating means for flow of said well stream liquid to the heating zone to be heated therein with free water collecting in the lower portion of the treating vessel and oil arising upwardly in the heating zone toward the filter zone, an oil metering apparatus and a water metering apparatus each having a metering vessel in said treating vessel in the lower portion thereof and in spaced apart relation, said heating means being between the metering vessels, said metering vessels each having central portions with reduced volume sections forming upper and lower portions thereof, said central portions having ends extending through the side wall of the vessel with said ends each forming an opening to the respective central portion, a manhole cover normally secured to each of said ends in closing relation to said openings to the central portions, a duct for each of said metering vessels communicating the top portions thereof with the upper portion of the treating vessel for pressure equalization, an oil overflow line communicating with the oil outlet zone in upwardly spaced relation to the filter zone to maintain an oil level therein, said oil overflow line extending downwardly and communicating with the lower portion of the oil meter vessel, a water siphon assembly having an inlet in the lower portion of the treating vessel and an outlet disposed to maintain an oil-water interface adjacent to and below the filter zone, the water siphon outlet duct communicating with the lower portion of the water meter vessel for flow of water thereto from said water siphon, an oil discharge line, a water discharge line, a three-way valve in the oil metering vessel inlet line connected with the oil discharge line, a three-way valve in the water metering vessel inlet line and having connection with the water discharge line, means responsive to the rise of liquid level in the upper portion of the oil metering vessel and operatively connected with the three-way valve in the oil line to close the flow from the oil outlet zone and effect communication from the metering vessel to the oil discharge line for discharge of oil from said oil metering vessel, means responsive to lowering of the liquid level in the oil metering vessel and operatively connected with the respective three-way valve to actuate same to close the oil discharge line and effect communication from the oil outlet zone to the oil metering vessel for filling of said oil metering vessel and corresponding means responsive to rise of level in the upper portion of the water metering vessel and the lowering of level in the lower portion of said water metering vessel and operatively connected to the respective three-way valve in the water line for permitting filling of said water metering vessel and the discharge of the water therefrom through the water discharge line.

3. A treater separator metering assembly as set forth in claim 2 wherein the inlet to the siphon of the water communicates with the lower portion of the treating vessel adjacent the bottom thereof and said siphon has an opening at a level where the combined head of oil and water in the treating vessel equals the head of water in the siphon for return flow of the water from the treating vessel to effect circulation and heat in the water to the bottom wall of the treating vessel and around the metering vessels disposed therein.

References Cited by the Examiner
UNITED STATES PATENTS

| | | | |
|---|---|---|---|
| 2,940,310 | 6/1960 | Henderson | 73—200 |
| 2,971,376 | 2/1961 | Glasgow et al. | 73—200 |
| 3,021,709 | 2/1962 | Walker et al. | 73—200 |
| 3,040,572 | 6/1962 | Henderson et al. | 73—200 |

RICHARD C. QUEISSER, *Primary Examiner.*

EDWARD D. GILHOOLY, *Assistant Examiner.*